US007661064B2

(12) United States Patent
Cicerone

(10) Patent No.: US 7,661,064 B2
(45) Date of Patent: Feb. 9, 2010

(54) DISPLAYING TEXT INTRALINE DIFFING OUTPUT

(75) Inventor: Derek M. Cicerone, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 11/368,730

(22) Filed: Mar. 6, 2006

(65) Prior Publication Data

US 2007/0208998 A1    Sep. 6, 2007

(51) Int. Cl.
*G06F 17/00* (2006.01)
*G06F 17/30* (2006.01)

(52) U.S. Cl. ............... 715/255; 715/210; 715/256; 715/273; 707/1; 707/10

(58) Field of Classification Search .......... 715/200, 715/209, 210, 227, 229, 255, 256, 264, 273, 715/274, 783; 707/1–7, 10, E17.002, E17.052, 707/E17.053
See application file for complete search history.

(56) References Cited

U.S. PATENT DOCUMENTS

| RE35,861 | E * | 7/1998 | Queen ................. 715/210 |
|---|---|---|---|
| 5,926,812 | A * | 7/1999 | Hilsenrath et al. ............ 707/5 |
| 6,178,417 | B1 * | 1/2001 | Syeda-Mahmood ............ 707/3 |
| 6,366,933 | B1 * | 4/2002 | Ball et al. ............ 715/203 |
| 6,714,670 | B1 * | 3/2004 | Goldsworthy et al. ....... 382/149 |
| 6,898,764 | B2 | 5/2005 | Kemp ............ 715/762 |
| 6,978,419 | B1 * | 12/2005 | Kantrowitz ............ 715/209 |
| 6,986,121 | B1 | 1/2006 | Boshier et al. ............ 717/108 |
| 7,076,486 | B2 * | 7/2006 | Livshits ............ 707/6 |
| 7,120,581 | B2 * | 10/2006 | Kahn et al. ............ 704/235 |
| 7,260,773 | B2 * | 8/2007 | Zernik ............ 715/229 |
| 2004/0049571 | A1 | 3/2004 | Johnson et al. ............ 709/224 |
| 2004/0128143 | A1 | 7/2004 | Kahn et al. ............ 704/277 |
| 2004/0181561 | A1 | 9/2004 | Knox et al. ............ 707/203 |
| 2005/0010576 | A1 | 1/2005 | Ren et al. ............ 707/100 |
| 2005/0010607 | A1 | 1/2005 | Parker et al. ............ 707/200 |
| 2005/0010864 | A1 | 1/2005 | Horikiri et al. ............ 715/511 |
| 2005/0010870 | A1 * | 1/2005 | Gu et al. ............ 715/540 |

(Continued)

OTHER PUBLICATIONS

P. Heckel, "A Technique for Isolating Differences Between Files", Communications of the ACM, vol. 21, No. 4, Apr. 1978, pp. 264-268.*

(Continued)

*Primary Examiner*—Laurie Ries
*Assistant Examiner*—MaiKhanh Nguyen
(74) *Attorney, Agent, or Firm*—Merchant & Gould

(57) ABSTRACT

Text intraline diffing output may be provided. Based on a comparison of each of a first plurality of lines to a second plurality of lines, a deleted line set and an added line set may be created. The deleted line set may comprise lines selected from the first plurality of lines that are not identical to any line present in the second plurality of lines. The added line set may comprise lines selected from the second plurality of lines that are not identical to any line present in the first plurality of lines. Next, a matrix may be created comprising a plurality of weights. A path may then be established through the matrix that maximizes a number of matching lines between the deleted line set and the added line set. Moreover, each of the matching lines may be displayed in which word differences may be indicated.

17 Claims, 5 Drawing Sheets

U.S. PATENT DOCUMENTS

| | | |
|---|---|---|
| 2005/0021570 A1 | 1/2005 | Thompson ................... 707/200 |
| 2005/0021572 A1 | 1/2005 | Ren et al. .................... 707/203 |
| 2005/0102288 A1 | 5/2005 | Liu et al. ....................... 707/10 |
| 2005/0131860 A1* | 6/2005 | Livshits ........................... 707/1 |
| 2005/0138401 A1 | 6/2005 | Terao et al. .................. 713/189 |
| 2005/0141750 A1 | 6/2005 | Rhoads et al. .............. 382/100 |

OTHER PUBLICATIONS

W. Tichy, "The String-to-String Correction Problem with Block Moves", ACM Transaction on Computer Systems, vol. 2, No. 4, Nov. 1984, pp. 309-321.*

X. Tang et al., "Fast Evaluation of Sequence Pair in Block Placement by Longest Common Subsequence Computation", IEEE Transactions on Computer-Aided Design of Integrated Circuits and Systems, vol. 20, No. 12, Dec. 2001, pp. 1406-1413.*

Hyyro et al., "Increased Bit-Parallelism for Approximate and Multiple String Matching", ACM Journal of Experimental Algorithmics, vol. 10, No. 2.6, Dec. 2005, pp. 1-27.*

Masaki Murata et al., "Using the DIFF Command for Natural Language Processing," Aug. 13, 2002, Internet site, 10 pages.

Charles Curley, "Getting Started with Emacs," Internet site, 8 pages.

Max Völkel, "D2.3.3.v1 SemVersion—Versioning RDF and Ontologies," Internet site, Jun. 6, 2005, pp. 1-37 (43 pages total).

* cited by examiner

```
59  >>  >>  core.ClearJob();
60  >>  >>  core.SetJobProduct(LI ("012Std"));
        >>  core.SetJobProduct(LI ("012STD"));
61  >>  >>  core.SetJobAddOn(LI ("OutlookMUI.jp"));
62  >>  >>  core.SetJobAddOn(LI ("OUTLOOKMUI.jp"));
        >>  core.SetJobAddOn(LI ("ExcelMUI.jp"));
63  >>  >>  core.SetJobAddOn(LI ("EXCELMUI.jp"));
        >>  core.SetJobAddOn(LI ("PowerPointMUI.jp"));
64  >>  >>  core.SetJobAddOn(LI ("POWERPOINTMUI.jp"));
65  >>  >>  core.SetJobAddOn(LI ("OfficeMUI.jp"));
        >>  core.SetJobAddOn(LI ("OFFICEMUI.jp"));
66  >>  >>  core.SetJobAddOn(LI ("WordMUI.jp"));
        >>  core.SetJobAddOn(LI ("WORDMUI.jp"));
    >>  >>  core.SetJobAddOnGroup(LI ("012Std"), LI ("culture"), LI ("en"));
        >>  core.SetJobAddOnGroup(LI ("012STD"), LI ("culture"), LI ("en"));
67
```

FIG. 4

| 59 | | core.ClearJob(); |
|---|---|---|
| (60) | <! | core.SetJobProduct(LI("012Std")); |
| 60 | !> | core.SetJobProduct(LI("012STD")); |
| (61) | <! | core.SetJobAddOn(LI("OutlookMUI.jp")); |
| 61 | >! | core.SetJobAddOn(LI("OUTLOOKMUI.JP")); |
| (62) | <! | core.SetJobAddOn(LI("ExcelMUI.jp")); |
| 62 | <! | core.SetJobAddOn(LI("EXCELMUI.JP")); |
| | !> | core.SetJobAddOn(LI("PowerpointMUI.jp")); |
| | <! | core.SetJobAddOn(LI("OfficeMUI.jp")); |
| | <! | core.SetJobAddOn(LI("WordMUI.jp")); |
| | <! | core.SetJobAddOnGroup(LI("012Std"), LI("culture"), LI("en")); |
| 63 | >! | core.SetJobAddOn(LI("POWERPOINTMUI.JP")); |
| 64 | >! | core.SetJobAddOn(LI("OFFICEMUI.JP")); |
| 65 | >! | core.SetJobAddOn(LI("WORDMUI.JP")); |
| 66 | >! | core.SetJobAddOnGroup(LI("012STD"), LI("culture"), LI("en")); |
| 67 | | |
| 68 | | } // scope |

FIG. 5

DISPLAYING TEXT INTRALINE DIFFING OUTPUT

BACKGROUND

In computing, "diff" is a file comparison utility that outputs differences between two text files. Furthermore, the diff utility's output is also called a diff. In some situations, diff utilities can display differing section sub-parts between two text files or side-by-side differences between two text files. Conventional diff utilities, however, do not look inside the differing section sub-parts and determine which lines are similar in order to provide a more efficient diff display to a user. Rather, with conventional diff utilities, changes in a text line part are difficult to view because left and right lines are simply displayed next to one another in a horizontal or vertical alignment. Thus with conventional diff utilities, its not possible to highlight just a line's portion that is different from the other text file being compared. While conventional diff utilities can show intraline differences so long as the differences is a single line that changed in isolation, conventional diff utilities do not match up similar lines in the context of an entire block of differing lines. Consequently, developers cannot efficiently see intraline differences between two text files. This often causes problems, for example, because the conventional strategy does not highlight just a line's portion that has changed.

SUMMARY

Displaying text intraline diffing output may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

In accordance with one embodiment, a computer-readable medium is provided that stores a set of instructions which when executed performs a method for providing text intraline diffing output. The method, executed by the set of instructions, may comprise creating, based on a comparison of each of a first plurality of lines to a second plurality of lines, a deleted line set and an added line set. The deleted line set may comprise lines selected from the first plurality of lines that are not identical to any line present in the second plurality of lines. The added line set may comprise lines selected from the second plurality of lines that are not identical to any line present in the first plurality of lines. The method may further comprise creating a matrix comprising a plurality of weights. Each one of the plurality of weights may respectively correspond to a comparison of each line in the deleted line set to each line in the added line set. In addition, each weight in the plurality of weights may comprise an index indicating how similar a respective line in the deleted line set is to a respective line in the added line set. In addition, the method may comprise establishing a path through the matrix that maximizes a number of matching lines between the deleted line set and the added line set and that maximizes a quality of the matching lines between the deleted line set and the added line set. Moreover, the method may comprise displaying adjacently each of the matching lines between the deleted line set and the added line set corresponding to the established path. Word differences between each of the displayed matching lines may be indicated.

According to another embodiment, a system for providing text intraline diffing output may be provided. The system may comprise a memory storage and a processing unit coupled to the memory storage. The processing unit may be operative to separate a first text file into a first plurality of lines and a second text file into a second plurality of lines. In addition, the processing unit may be operative to create, based on a comparison of each of the first plurality of lines to the second plurality of lines, a deleted line set and an added line set. The deleted line set may comprise lines selected from the first plurality of lines that are not identical to any line present in the second plurality of lines. The added line set may comprise lines selected from the second plurality of lines that are not identical to any line present in the first plurality of lines. Furthermore, the processing unit may be operative to create a matrix comprising a plurality of weights. Each one of the plurality of weights may respectively correspond to a comparison of each line in the deleted line set to each line in the added line set. Each weight in the plurality of weights may comprise an index indicating how similar a respective line in the deleted line set is to a respective line in the added line set. Moreover, the processing unit may be operative to establish a path through the matrix that may maximize a number of matching lines between the deleted line set and the added line set and that may maximize a quality of the matching lines between the deleted line set and the added line set. In addition, the processing unit may be operative to display adjacently each of the matching lines between the deleted line set and the added line set corresponding to the established path. Word differences between each of the displayed matching lines may be indicated.

In accordance with yet another embodiment, a method for providing text intraline diffing output may be provided. The method may comprise creating, based on a comparison of each of a first plurality of lines to a second plurality of lines, a deleted line set and an added line set. The deleted line set may comprise lines selected from the first plurality of lines that are not identical to any line present in the second plurality of lines. The added line set may comprise lines selected from the second plurality of lines that are not identical to any line present in the first plurality of lines. The method may further comprise creating a matrix comprising a plurality of weights, each one of the plurality of weights may respectively correspond to a comparison of each line in the deleted line set to each line in the added line set. Each weight in the plurality of weights may comprise an index indicating how similar a respective line in the deleted line set is to a respective line in the added line set. Moreover, the method may comprise establishing a path through the matrix that maximizes a number of matching lines between the deleted line set and the added line set and that maximizes a quality of the matching lines between the deleted line set and the added line set. Also, the method may comprise displaying adjacently each of the matching lines between the deleted line set and the added line set corresponding to the established path. Word differences between each of the displayed matching lines may be indicated. For example, lines from the deleted line set may be shaded in a first color, lines from the added line set may be shaded in a second color, words present in the deleted line set but not in the added line set may be shaded in a third color, and words present in the added line set but not in the deleted line set may be shaded in a fourth color.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 4 is a screen shot illustrating a text intraline diffing output display; and FIG. 5 is a screen shot illustrating a conventional diffing output display.

DETAILED DESCRIPTION

Figure 1:
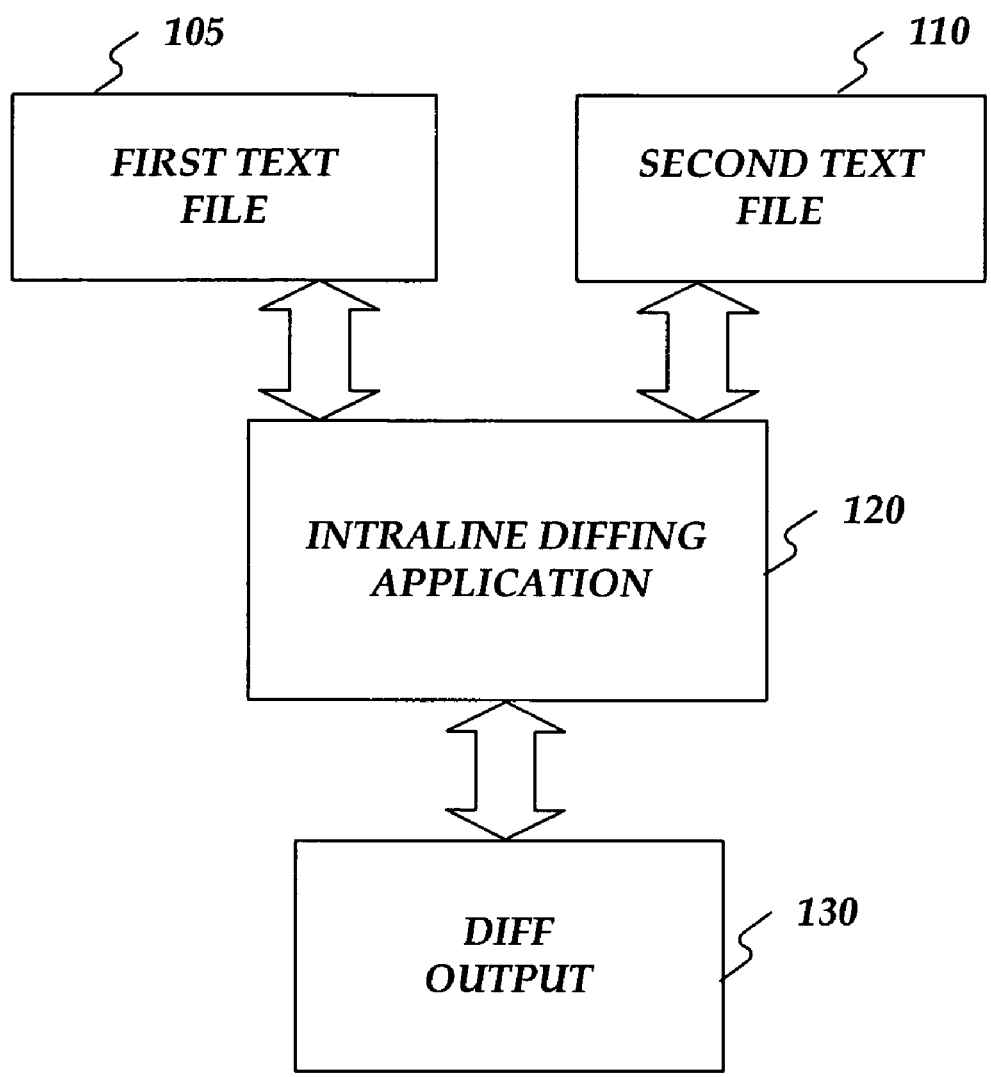
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Text intraline diffing output may be provided. Conventional text diffing programs can display sub-parts of differing sections or side-by-side differences for two text files. Consistent with embodiments of the invention, however, an algorithm can evaluate differing text sub-parts and determine which lines are similar. Theses similar lines can then be displayed to a user in a more efficient view. With conventional systems, as shown in conventional output screen shot 500 in FIG. 5 for example, viewing changes to only text line portions is difficult because left and right lines are simply displayed next to one another in a horizontal or vertical alignment. Consistent with embodiments of the invention, however, a line's changed portion may be highlighted, thus allowing developers to be more efficiently view intraline differences.

FIG. 1 is a block diagram of an operating environment 100 consistent with embodiments of the invention. Operating environment 100 may include a first text file 105, a second text file 110, an intraline diffing application 120, and a diff output 130. First text file 105 may comprise, but is not limited to, computer programming code. Second text file 110 may comprise a version of first text file 105 that has been changed, for example, by adding lines, deleting lines, or changing lines from first text file 105. First text file 105 and second text file 110 may comprise any information in any form, language, or character set and are not limited to computer code. Intraline diffing application 120 may evaluate, for example, differing text sub-parts from first text file 105 and second text file 110 and determine which lines are similar between first text file 105 and second text file 110. Then, intraline diffing application 120 may display, in diff output 130, a line's changed portion that may be highlighted. This may allow a viewer to efficiently view intraline differences in diff output 130. A screen shot 400, corresponding to an example diff output 130, is shown in FIG. 4.

An embodiment consistent with the invention may comprise a system for providing text intraline diffing output may be provided. The system may comprise a memory storage and a processing unit coupled to the memory storage. The processing unit may be operative to separate a first text file into a first plurality of lines and a second text file into a second plurality of lines. In addition, the processing unit may be operative to create, based on a comparison of each of the first plurality of lines to the second plurality of lines, a deleted line set and an added line set. The deleted line set may comprises lines selected from the first plurality of lines that are not identical to any line present in the second plurality of lines. The added line set may comprise lines selected from the second plurality of lines that are not identical to any line present in the first plurality of lines. Furthermore, the processing unit may be operative to create a matrix comprising a plurality of weights. Each one of the plurality of weights may respectively correspond to a comparison of each line in the deleted line set to each line in the added line set. Each weight in the plurality of weights may comprise an index indicating how similar a respective line in the deleted line set is to a respective line in the added line set. Moreover, the processing unit may be operative to establish a path through the matrix that may maximize a number of matching lines between the deleted line set and the added line set and that may maximize a quality of the matching lines between the deleted line set and the added line set. In addition, the processing unit may be operative to display adjacently each of the matching lines between the deleted line set and the added line set corresponding to the established path. Word differences between each of the displayed matching lines may be indicated.

Figure 2:
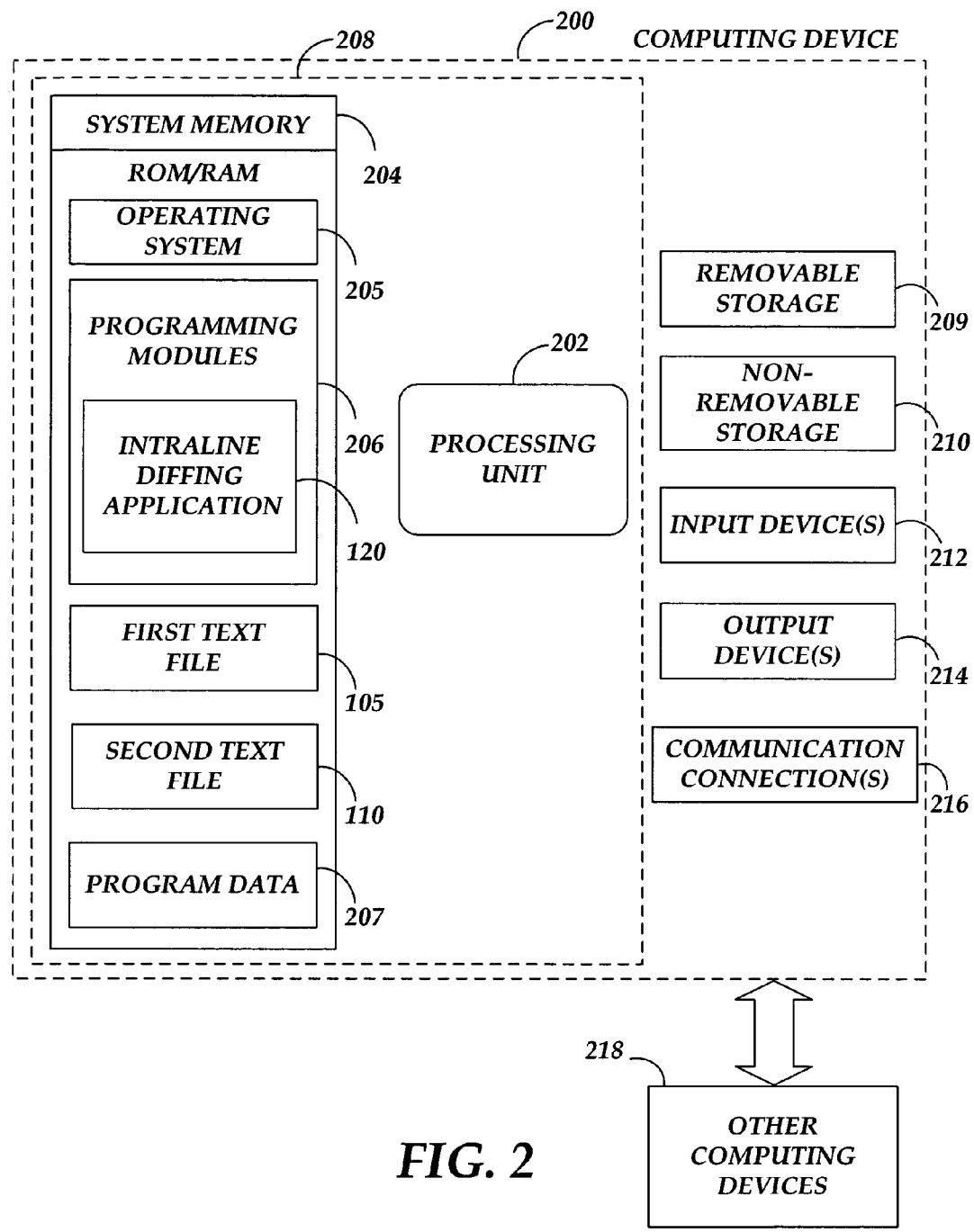
FIG. 2 is a block diagram of a system including a computing device.

FIG. 2 is a block diagram of a system including computing device 200. Consistent with an embodiment of the invention, the aforementioned memory storage and processing unit may be implemented in a computing device, such as computing device 200 of FIG. 2. Any suitable combination of hardware, software, or firmware may be used to implement the memory storage and processing unit. For example, the memory storage and processing unit may be implemented with computing device 200 or any of other computing devices 218, in combination with computing device 200. The aforementioned system, device, and processors are examples and other systems, devices, and processors may comprise the aforementioned memory storage and processing unit, consistent with embodiments of the invention. Furthermore, computing device 200 may comprise an operating environment for system 100 as described above. System 100 may operate in other environments and is not limited to computing device 200.

With reference to FIG. 2, a system consistent with an embodiment of the invention may include a computing device, such as computing device 200. In a basic configuration, computing device 200 may include at least one processing unit 202 and a system memory 204. Depending on the configuration and type of computing device, system memory 204 may comprise, but is not limited to, volatile (e.g. random access memory (RAM)), non-volatile (e.g. read-only memory (ROM)), flash memory, or any combination. System memory 204 may include operating system 205, one or more programming modules 206, first text file 105, second text file 110, and may include a program data 207. Operating system 205, for example, is suitable for controlling computing device 200's operation. In one embodiment, programming modules 206 may include intraline diffing application 120. Furthermore, embodiments of the invention may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, intraline diffing application 120 may perform processes including, for example, one or more method 300's stages as described below. The aforementioned process is an example, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
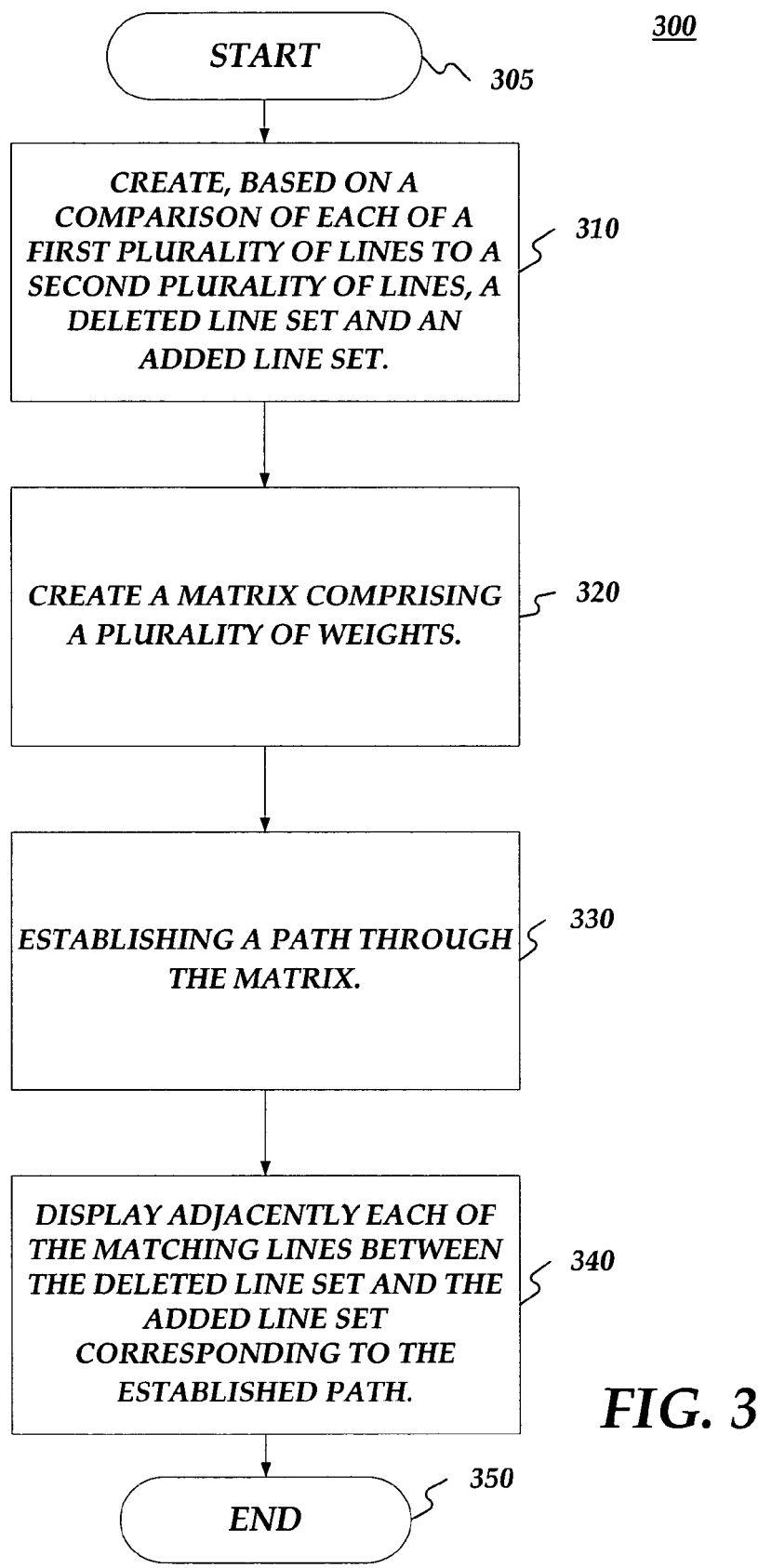
FIG. 3 is a flow chart of a method for displaying text intraline diffing output.

FIG. 3 is a flow chart setting forth the general stages involved in a method 300 consistent with an embodiment of the invention for providing text intraline diffing output using system 200 of FIG. 2. Ways to implement the stages of method 300 will be described in greater detail below. Method 300 may begin at starting block 305 and proceed to stage 310 where computing device 200 may create, based on a comparison of each of a first plurality of lines to a second plurality of lines, a deleted line set and an added line set. The deleted line set may comprise lines selected from the first plurality of lines that are not identical to any line present in the second plurality of lines. The added line set may comprise lines selected from the second plurality of lines that are not identical to any line present in the first plurality of lines. For example, intraline diffing application 120 may receive first text file 105's contents and second text file 110's contents. Intraline diffing application 120 may then separate first text file 105 into the first plurality of lines. Similarly, intraline diffing application 120 may also separate second text file 110 into the second plurality of lines. Consistent with an embodiment of the invention, intraline diffing application 120 may use a longest common subsequence (LCS) algorithm when separating first text file 105 into the first plurality of lines and when separating second text file 110 into the second plurality of lines.

From stage 310, where computing device 200 creates the deleted line set and the added line set, method 300 may advance to stage 320 where computing device 200 may create a matrix comprising a plurality of weights. Each one of the plurality of weights may respectively correspond to a comparison of each line in the deleted line set to each line in the added line set. Also, each weight in the plurality of weights may comprise an index indicating how similar a respective line in the deleted line set is to a respective line in the added line set. For example, Table 1 illustrates a matrix populated with weights. As shown in Table 1 below, A1 through A4 may comprise the deleted line set and B1 through B5 may comprise the added line set.

TABLE 1

|    | B1  | B2  | B3  | B4  | B5  |
|----|-----|-----|-----|-----|-----|
| A1 | 20% | 99% | 5%  | 10% | 50% |
| A2 | 10% | 5%  | 99% | 4%  | 5%  |
| A3 | 5%  | 6%  | 5%  | 99% | 40% |
| A4 | 1%  | 5%  | 6%  | 10% | 99% |

Consistent with embodiments of the invention, in order to calculate each weight, an algorithm may determine how similar two lines are to one another. Because a line may be broken down into words and/or symbols that comprise it, words and/or symbols in a line may be treated in a manner similar to how lines were treated above with respect to stage 310. For example, intraline diffing application 120 may use the LCS algorithm when calculating weights. Consequently, a first line may be broken into words and a second line may also be broken into words. The LCS algorithm may be used to determine which words are similar between the first and second lines. In other words, the same matrix and path concepts describe above may be used here, only they may now be applied for comparing words instead of lines.

Running the LCS algorithm may accomplish, for example, two things. First, it may discover the words that are identical, deleted, and added between a given set of two lines. Also, by using the characters that are identical, deleted, and added, weights may be calculated to how similar two lines may be. The weight, in turn, may be used to determine which lines are similar. Furthermore, details for which words are identical/deleted/added may be saved in memory so that if a given set of lines are determined to be similar, their differences may be displayed by just highlighting words that are different as discussed below with respect to stage 340.

Once computing device 200 creates the matrix comprising the plurality of weights in stage 320, method 300 may continue to stage 330 where computing device 200 may establish a path through the matrix. The path may maximize a number of matching lines between the deleted line set and the added line set and may maximize a quality of the matching lines between the deleted line set and the added line set. For example, to determine the optimal path, a second matrix may be created that keeps track of a best path. This may be accomplished by looking in the weight matrix at the cell above, diagonally left/up, and to the left of a current cell. At each point, it may be determined which direction towards the top/left of the weight matrix may result in the highest average of pairs of lines (e.g. a pair of lines may comprise A1B1 or A1B2.)

As the LCS algorithm is running, it may keep track of the best path (e.g. each cell may contain the direction to go to re-trace the best path). The LCS algorithm may use the weights in the weight matrix to determine what that path should be. As shown in Table 1, the best path may comprise A1B2, A2B3, A3B4, and A4B5. Moreover, a threshold may be used to determine if a set of lines are considered "matching" (e.g. this threshold may comprise, but is not limited to 50%). In other words, if at least some threshold of a line pair matches, then those lines are considered similar.

Consistent with embodiments of the invention, rules for deciding if one set of matching lines (i.e. a path) is better than another may be used. First, if a given pair is the only pair of lines, it may be considered the best path. This happens, for example, for the first pair of lines evaluated. It may be the best match because there may be no others to compare it to. Next, the best path up to this point taken to get to each pair of lines may be evaluated. If one path involves going through more matching lines than another, then it may be considered better. Or, if multiple paths involve the same number of matching lines, but one has a higher average weight, then the highest average path may be considered better. In other words, intraline diffing application 120 may try to find a path through the weight matrix that may maximize the number of matching lines and also maximize the quality of those matches.

The following is an example of what a path may comprise, for example, during the middle of diffing application 120 running the algorithm. As shown in Table 2, the path to this point may comprise, for example, A2B3→A1B2. Note that B1 has no matching line.

TABLE 2

|    | B1  | B2   | B3       | B4   | B5   |
|----|-----|------|----------|------|------|
| A1 | —   | left | left     | left | left |
| A2 | up  | up   | diagonal | ...  |      |
| A3 |     |      |          |      |      |
| A4 |     |      |          |      |      |

Consistent with embodiments of the inventions, the algorithm may start at the weight matrix's bottom-right-hand corner and then work its way back towards the top-left. In this way, the algorithm may finding an optimal path. In Table 3's example, the best path may comprise A4B5, A3B4, A2B3, and A1B2.

TABLE 3

|    | B1  | B2   | B3       | B4       | B5       |
|----|-----|------|----------|----------|----------|
| A1 | —   | left | left     | left     | left     |
| A2 | up  | up   | diagonal | ...      | ?        |
| A3 | ?   | ?    | ?        | diagonal | ?        |
| A4 | ?   | ?    | ?        | ?        | diagonal |

After computing device 200 establishes the path through the matrix in stage 330, method 300 may proceed to stage 340 where computing device 200 may display adjacently in diff output 130 each of the matching lines between the deleted line set and the added line set corresponding to the established path. Referring to the Table 3 example above, the lines corresponding to Table 3 may be displayed on one of display device(s) 214 as follows:

B1 (since it comes before B2 and has no similar line, it comes first)
A1
B2
A2
B3
A3
B4
A4
B5

Moreover, word differences between each of the displayed matching lines may be indicated. For example, intraline diffing application 120 may display in diff output 130 a line's changed portion that may be highlighted, thus allowing a diff output 130 viewer to efficiently view intraline differences. An example of diff output 130 is shown in FIG. 4. Once computing device 200 displays adjacently each of the matching lines in stage 340, method 300 may then end at stage 350.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-readable storage medium which stores a set of instructions which when executed, by a computer, performs a method for providing text intraline diffing output, the method executed by the set of instructions comprising:

creating, based on a comparison of each of a first plurality of lines to a second plurality of lines, a deleted line set and an added line set, the deleted line set comprising lines selected from the first plurality of lines that are not identical to any line present in the second plurality of lines and the added line set comprising lines selected from the second plurality of lines that are not identical to any line present in the first plurality of lines;

creating a matrix comprising a plurality of weights, each one of the plurality of weights respectively corresponding to a comparison of each line in the deleted line set to each line in the added line set, each weight in the plurality of weights comprising an index indicating how similar a respective line in the deleted line set is to a respective line in the added line set;

establishing a path through the matrix that maximizes a number of matching lines between the deleted line set and the added line set and that maximizes a quality of the matching lines between the deleted line set and the added line set, wherein establishing the path through the matrix comprises beginning at a lower right corner cell of the matrix and proceeding through the matrix by consecutively selecting adjacent cells, wherein consecutively selecting adjacent cells comprises selecting a cell in the matrix that is one of: above a current cell, diagonally left/up from the current cell, and left of the current cell, wherein consecutively selecting adjacent cells comprises consecutively selecting adjacent cells to maximize an average of weights in the plurality of weights corresponding to the path; and displaying adjacently each of the matching lines between the deleted line set and the added line set corresponding to the established path, wherein word differences between each of the displayed matching lines are indicated.

2. The computer-readable storage medium of claim 1, further comprising receiving a first text file and a second text file.

3. The computer-readable storage medium of claim 2, further comprising separating the first text file into the first plurality of lines and the second text file into the second plurality of lines.

4. The computer-readable storage medium of claim 3, wherein separating the first text file into the first plurality of lines and the second text file into the second plurality of lines comprises using a longest common subsequence (LCS) algorithm.

5. The computer-readable storage medium of claim 1, wherein creating the matrix comprising the plurality of weights further comprises calculating the index for each of the weights in the plurality of weights, calculating the index comprising:

determining words that are present in both the line from the deleted line set line and the line from added line set corresponding to the respective weight;

determining words that are present in the line from the deleted line set line but not in the line from the added line set corresponding to the respective weight; and determining words that are present in the line from the added line set line but not in the line from the deleted line set corresponding to the respective weight.

6. The computer-readable storage medium of claim 1, wherein displaying further comprises determining the word differences between each of the displayed matching lines wherein determining the word differences further comprises:

determining, for each of the matching lines, words that are present in both the deleted line set line and the added line set corresponding to each respective match;

determining, for each of the matching lines, words that are present in the deleted line set line but not in the added line set corresponding to each respective match; and determining, for each of the matching lines, words that are present in the added line set line but not in the deleted line set corresponding to each respective match.

7. A system for providing text intraline diffing output, the system comprising:

a memory storage; and a processing unit coupled to the memory storage, wherein the processing unit is operative to:

separate a first text file into a first plurality of lines and a second text file into a second plurality of lines;

create, based on a comparison of each of the first plurality of lines to the second plurality of lines, a deleted line set and an added line set, the deleted line set comprising lines selected from the first plurality of lines that are not identical to any line present in the second plurality of lines and the added line set comprising lines selected from the second plurality of lines that are not identical to any line present in the first plurality of lines;

create a matrix comprising a plurality of weights, each one of the plurality of weights respectively corresponding to a comparison of each line in the deleted line set to each line in the added line set, each weight in the plurality of weights comprising an index indicating how similar a respective line in the deleted line set is to a respective line in the added line set, wherein the processing unit being operative to create the matrix comprising the plurality of weights further comprises the processing unit being operative to calculate the index for each of the weights in the plurality of weights, the processing unit being operative to:

determine words that are present in both the line from the deleted line set line and the line from added line set corresponding to the respective weight, determine words that are present in the line from the deleted line set line but not in the line from the added line set corresponding to the respective weight, and determine words that are present in the line from the added line set line but not in the line from the deleted line set corresponding to the respective weight;

establish a path through the matrix that maximizes a number of matching lines between the deleted line set and the added line set and that maximizes a quality of the matching lines between the deleted line set and the added line set; and display adjacently each of the matching lines between the deleted line set and the added line set corresponding to the established path, wherein word differences between each of the displayed matching lines are indicated.

8. The system of claim 7, further comprising the processing unit being operative to receive the first text file and the second text file.

9. The system of claim 7, wherein the processing unit being operative to separate the first text file into the first plurality of lines and the second text file into the second plurality of lines comprises the processing unit being operative to use a longest common subsequence (LOS) algorithm.

10. The system of claim 7, wherein the processing unit being operative to establish the path through the matrix comprises the processing unit being operative to begin at a lower right corner cell of the matrix and to proceed through the matrix by consecutively selecting adjacent cells, wherein consecutively selecting adjacent cells comprises selecting a cell in the matrix that is one of: above a current cell, diagonally left/up from the current cell, and left of the current cell, wherein consecutively selecting adjacent cells comprises consecutively selecting adjacent cells to maximize an average of weights in the plurality of weights corresponding to the path.

11. The system of claim 7, wherein the processing unit being operative to display further comprises the processing unit being operative to determine the word differences between each of the displayed matching lines wherein the processing unit being operative to determine the word differences comprises the processing unit being operative to:

determine, for each of the matching lines, words that are present in both the deleted line set line and the added line set corresponding to each respective match;

determine, for each of the matching lines, words that are present in the deleted line set line but not in the added line set corresponding to each respective match; and determine, for each of the matching lines, words that are present in the added line set line but not in the deleted line set corresponding to each respective match.

12. A method in a computer system for providing text intraline diffing output, the method comprising:

creating, by a processor based on a comparison of each of a first plurality of lines to a second plurality of lines, a deleted line set and an added line set, the deleted line set comprising lines selected from the first plurality of lines that are not identical to any line present in the second plurality of lines and the added line set comprising lines selected from the second plurality of lines that are not identical to any line present in the first plurality of lines;

creating, by the processor, a matrix comprising a plurality of weights, each one of the plurality of weights respectively corresponding to a comparison of each line in the deleted line set to each line in the added line set, each weight in the plurality of weights comprising an index indicating how similar a respective line in the deleted line set is to a respective line in the added line set;

establishing a path through the matrix that maximizes a number of matching lines between the deleted line set and the added line set and that maximizes a quality of the matching lines between the deleted line set and the added line set; and displaying, by the processor, adjacently each of the matching lines between the deleted line set and the added line set corresponding to the established path, wherein word differences between each of the displayed matching lines are indicated, wherein lines from the deleted line set are shaded in a first color, lines from the added line set are shaded in a second color, words present in the deleted line set but not in the added line set are shaded in a third color, and words present in the added line set but not in the deleted line set are shaded in a fourth color, wherein displaying further comprises determining the word differences between each of the displayed matching lines wherein determining the word differences further comprises:

determining, for each of the matching lines, words that are present in both the deleted line set line and the added line set corresponding to each respective match;

determining, for each of the matching lines, words that are present in the deleted line set line but not in the added line set corresponding to each respective match; and determining, for each of the matching lines, words that are present in the added line set line but not in the deleted line set corresponding to each respective match.

13. The method of claim 12, further comprising receiving a first text file and a second text file.

14. The method of claim 13, further comprising separating the first text file into the first plurality of lines and the second text file into the second plurality of lines.

15. The method of claim 14, wherein separating the first text file into the first plurality of lines and the second text file into the second plurality of lines comprises using a longest common subsequence (LOS) algorithm.

16. The method of claim 12, wherein establishing the path through the matrix comprises beginning at a lower right corner cell of the matrix and proceeding through the matrix by consecutively selecting adjacent cells, wherein consecutively selecting adjacent cells comprises selecting a cell in the matrix that is one of: above a current cell, diagonally left/up from the current cell, and left of the current cell, wherein consecutively selecting adjacent cells comprises consecutively selecting adjacent cells to maximize an average of weights in the plurality of weights corresponding to the path.

17. The method of claim 12, wherein creating the matrix comprising the plurality of weights further comprises calculating the index for each of the weights in the plurality of weights, calculating the index comprising:
  determining words that are present in both the line from the deleted line set line and the line from added line set corresponding to the respective weight;
  determining words that are present in the line from the deleted line set line but not in the line from the added line set corresponding to the respective weight; and
  determining words that are present in the line from the added line set line but not in the line from the deleted line set corresponding to the respective weight.

* * * * *

UNITED STATES PATENT AND TRADEMARK OFFICE
CERTIFICATE OF CORRECTION

| | | |
|---|---|---|
| PATENT NO. | : 7,661,064 B2 | Page 1 of 1 |
| APPLICATION NO. | : 11/368730 | |
| DATED | : February 9, 2010 | |
| INVENTOR(S) | : Derek M. Cicerone et al. | |

It is certified that error appears in the above-identified patent and that said Letters Patent is hereby corrected as shown below:

In column 11, line 55, in Claim 9, delete "(LOS)" and insert -- (LCS) --, therefor.

In column 13, line 7, in Claim 15, delete "(LOS)" and insert -- (LCS) --, therefor.

Signed and Sealed this
Tenth Day of May, 2011

David J. Kappos
*Director of the United States Patent and Trademark Office*